3,422,599
Patented Jan. 21, 1969

3,422,599
CHLORINE STRIPPING SECTION FOR DIRECT CONTACT CHLORINE COOLERS
Joseph M. Hildyard, 909 River Road, Rte. 1, Youngstown, N.Y. 14174
Filed Aug. 10, 1966, Ser. No. 571,610
U.S. Cl. 55—42          2 Claims
Int. Cl. B01d 19/00

ABSTRACT OF THE DISCLOSURE

An improvement in the direct contact treatment of wet chlorine gas produced from the electrolysis of alkali metal chloride brine, wherein hot, wet chlorine vapors are cooled in the direct contact cooler zone with a water solvent and the resultant warm water then stripped of dissolved chlorine in a stripping zone, which comprises maintaining the stripping zone under a reduced pressure between about 100 and about 700 millimeters mercury absolute, while maintaining the direct contact cooler zone at above atmospheric pressure; withdrawing the warmed water from the direct contact cooler zone and passing it to the stripping zone, wherein chlorine is flashed off as chlorine vapor under the reduced pressure maintained in the stripping zone. The stripped chlorine vapors are withdrawn from the top of the stripping zone and returned to the direct contact cooling section for recovery of the chlorine values. The total steam used for stripping the chlorine is less by two-thirds than the amount of steam needed in the prior art method using atmospheric pressure to strip off the chlorine. In addition the waste water from the stripper is cooler and therefore more pumpable and less corrosive.

---

Figure 1:
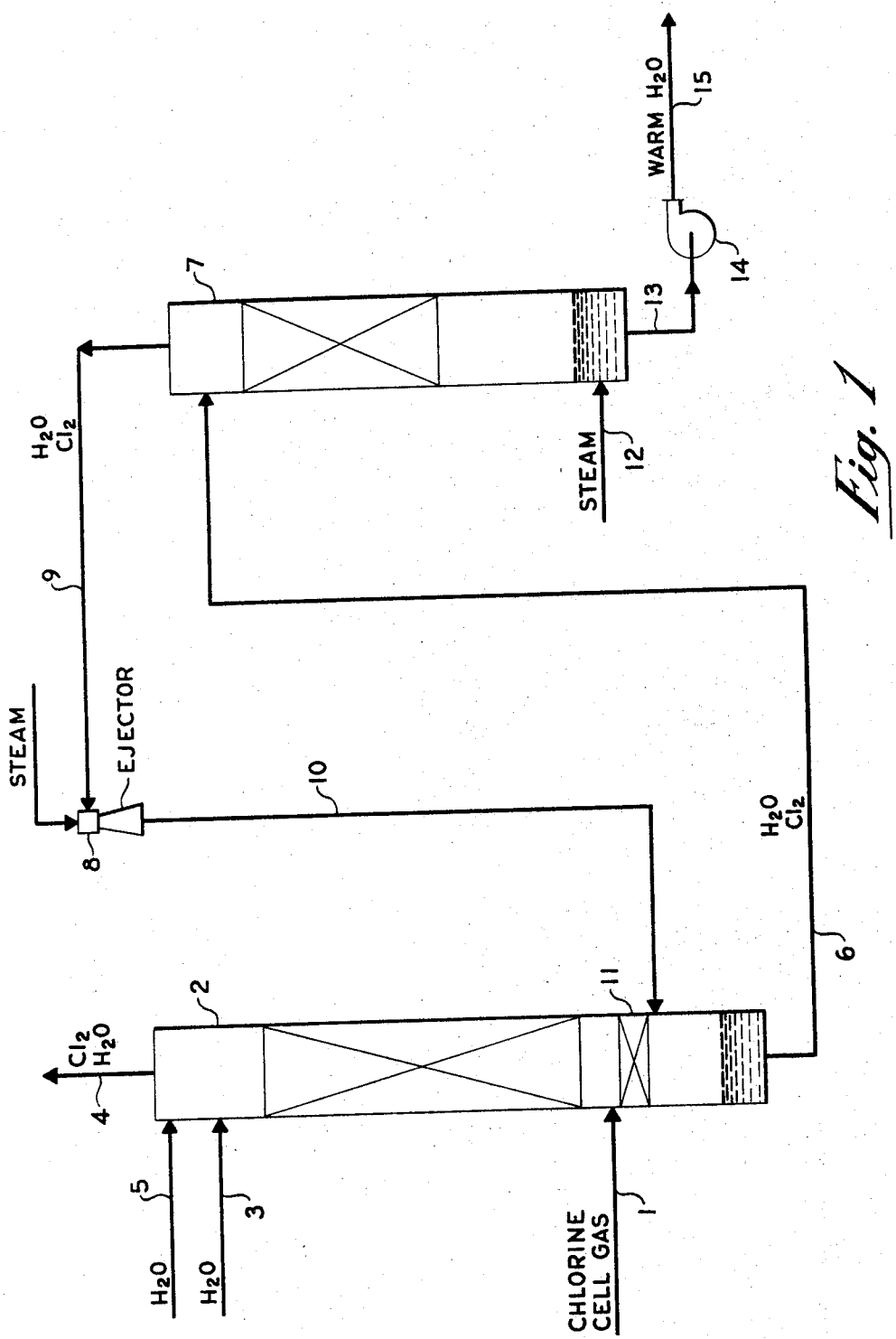

This invention relates to the direct contact chlorine cooler and stripping sections used in the chlor-alkali industry to treat the hot chlorine gas produced by the electrolysis of alkali metal chloride brine. And more particularly, it relates to a different method of operating the direct contact chlorine cooler and stripping sections so as to reduce the quantity of steam required for stripping cooler effluent.

In the electrolysis of alkali metal chloride brine, chlorine is evolved at the anode at an elevated temperature so that the warm or hot gases contain a considerable amount of water vapor. Prior to being dried and compressed, these hot, wet chlorine gases may be cooled with an aqueous solvent in what is known as the direct contact cooler. The most common means is to pass cool water countercurrently down a scrubbing tower in which the chlorine gases are passing upwardly through the same tower. Other coolants, such as brine, may also be used. At the top of the direct contact cooler, the cooled chlorine gas is then sent to a drying compression and liquefaction section.

At the bottom of the direct contact cooler section the warm water has in the past been passed down into a desorption or stripping section, where steam, introduced at the bottom, is used to strip off remaining amounts of chlorine from the water before this water passes out the bottom. In order to steam strip the chlorine from the down-coming cooling water, the warmed cooling water must be elevated to its boiling point and caused to evolve enough steam or water vapor to provide the stripping action. The cooling water in contact with the hot incoming chlorine and water vapors from the electrolytic cells would not reach a temperature greater than that of the incoming vapors, unless additional heat is supplied. In the past this heat has been supplied by steam, either by direct contact or by indirect heat exchange, in sufficient quantities to raise the cooling water from its near-equilibrium temperature with the incoming chlorine and water vapors to its boiling point at the direct contact cooler operating pressure, and in sufficient excess to provide the necessary vapors for stripping the chlorine from the cooling water.

The stripped chlorine and water vapors pass up into the direct contact cooler section where the chlorine values mix with the hot, wet chlorine cell gas.

The hot water coming from the bottom of the desorption section, near or at the boiling point of the solution, may be discarded or used as hot process water. This hot, stripped water has been found to be difficult to handle. It is too hot to pump because caviation problems arise unless sufficient elevation is given to the stripping section, it is corrosive and smelly from the presence of traces of chlorine and hypochlorite.

I have now found that considerable savings in steam stripping costs, and a more usable stripped water product from the desorption section can be achieved by splitting the direct contact cooler into a cooling section and a stripping and/or flashing section, and operating the stripping and/or flashing section under a vacuum, such as that which is achieved by a steam jet ejector means whose vacuum side is in communication with the top of the stripping and/or flashing section.

By operating the stripping and/or flashing section at reduced pressure, i.e., under vacuum conditions, the temperature difference between the boiling point of the cooling water in the stripping and/or flashing section and its equilibrium temperature with the incoming hot cell gas, can be reduced. This reduction in temperature difference thereby reduces the steam requirements to heat the water to about its boiling point (at the reduced pressure maintained in the stripping and/or flashing section). In addition, maintaining the stripping and/or flashing section at reduced pressures permits operating the stripper at conditions more favorable for the separation of the chlorine from the water.

The direct contact cooler zone is maintained at about atmospheric pressure, as before.

The exhaust ejector steam, that is, the vaporous material containing the stripped chlorine and the water vapors and steam from the off gas of the stripping and/or flashing section, is passed to near the bottom of the cooling section of the direct contact cooler and used to further preheat the cooling water passing to the stripping and/or flashing section, while the chlorine values mix with the hot, wet cell gases. This heat exchange is made more effective if carried out in a packed zone, or in a transfer zone formed by bubble-cap trays or the like.

Steam may be added to the stripping zone maintained under vacuum to raise the water to its boiling point and to help strip out the chlorine. The boiling point of the water is lowered by the vacuum being maintained, as compared with the method of the prior art. When operating in accordance with the preferred embodiment of this invention, it has been found that the total steam required by this method is less by two-thirds than the amount of steam needed for stripping the chlorine in accordance with the prior art.

The vacuum of the stripping and/or flashing section preferably is allowed to ride at whatever suction pressure the steam ejector will carry. This suction pressure depends on the temperature of the water going to the stripping and/or flashing section which in turn is dependent upon the humid chlorine gas temperature, such as that coming off the electrolytic cells, the amount of cooling water which is being added to the direct contact coolers, as well as on the design operating capacity of the means for maintaining the vacuum, e.g., the ejector. The design operating pressure of the stripping and/or flashing section is therefore a carefully engineered and designed set of conditions having as one of its primary objectives the minimizing of the total quantity of steam required to operate the chlorine cell gas direct contact cooler and stripping means (whether a flashing means, or a stripping section, or both), while at the same time recovering nearly all the chlorine. This total (minimum) quantity of steam is the sum of the steam used to heat the water admitted to the stripper from its entrance temperature to its boiling point at the operating pressure, plus the amount and quality of steam used to produce sufficient water vapor at the bottom of the stripper (to provide more effective stripping action), plus the amount of steam used to operate the steam jet ejector in a manner to provide the design vacuum conditions of the stripper and/or flash tank. The most economic vacuum is, in part, a function of the inlet water temperature to the vacuum stripping means. That is, the lower the inlet water temperature, the higher the vacuum to be economically used. Also, the most economic vacuum depends in part on the design and efficiency of operation of the steam jet ejector, or other means for maintaining the reduced pressure. Since these parameters will vary during commercial operation and from installation to installation, the actual vacuum in the chlorine cell gas vacuum stripper will also vary, but may be in a range between about 100 and about 700 millimeters of mercury absolute pressure. At pressures greater than 700 millimeters, the steam requirements become larger so that the savings do not offset the investment and operation costs. At pressures less than about 100 millimeters, the type of equipment required becomes more expensive than the savings in steam would justify. The preferred operating range in which to maintain the vacuum is between about 200 and about 600 millimeters of mercury absolute pressure.

While it is preferred to maintain the reduced pressure in the stripping zone with a steam jet ejector means, other known means for maintaining a reduced pressure in the desired range can also be used.

The pH of the water to be stripped is maintained below about seven in order to prevent the formation of hypochlorite and to aid in driving off elemental chlorine.

As a result of the chlorine cell gas stripping zone being maintained at a reduced pressure, the warm water stripped of chlorine leaving the stripping zone is at a substantially lower temperature than the temperature at which it was removed in accordance with the teaching of the prior art. The condition of the water is such that it can be pumped without substantial problems caused by cavitation, and the quality of the water is such that its corrosiveness and odor have been considerably reduced, if not entirely eliminated.

The invention is further illustrated in the following description by reference to FIGURES 1 and 2, which are each flow sheets showing two specific embodiments of the claimed invention. Unless otherwise indicated, all parts are by weight. These examples are by way of illustration only and are not to be construed as limiting except as defined in the appended claims.

EXAMPLE 1

Referring to FIGURE 1 wherein, subject to other requirements of the over-all chlor-alkali process, a non-optimum quantity of cooling water is used, hot chlorine cell gas from the electrolysis of sodium chloride brine, containing 9,150 parts per hour of chlorine and 2,030 parts per hour of water at about 80 degrees centigrade, is introduced through line 1 into the vertically disposed direct contact cooling section 2. The gas passes upwardly through the packed column and is cooled by 47,000 parts per hour of water being introduced at about 22 degrees centigrade through line 3. It is preferred (although not essential) that this water be derived from another source in the over-all process, such as from the effluent of the blow gas absorber system described in U.S. Patent 2,750,002. This water may have a small amount of dissolved chlorine in it under pressure which is flashed off upon being introduced into the top of the direct contact cooler and the chlorine values thereby recovered. This water passes countercurrently down through the column, while the cooled chlorine gas containing about 9,150 parts per hour of chlorine and about 100 parts per hour of water at 30 degrees centigrade is removed through line 4 and sent to a later stage in the processing for drying, compression and liquefaction of the chlorine. Auxiliary water may also be introduced through line 5.

At the bottom of the direct contact cooler 2, 49,530 parts per hour of warm water containing 181 parts per hour of dissolved chlorine, about 128.8 degrees Fahrenheit are removed through line 6. Any dissolved gases other than $CO_2$ contained in the incoming water are reduced to an insignificant amount in the direct contact cooler. This warm water containing residual amounts of dissolved chlorine is introduced into the top of the vertically disposed vacuum stripping section 7 container ceramic packing. The vacuum in the stripping section is maintained by steam jet ejector means 8. Here, about 550 parts per hour of steam at about 115 pounds per square inch gauge are introduced in a manner to create a suction on line 9 in communciation with the top portion of the vacuum stripping zone 7. In the vacuum section 7, the chlorine gas is stripped off and passes out through line 9 and into line 10 where it is introduced into the bottom portion of the direct contact cooler 2. The amount being introduced into the direct contact cooler is about 600 parts per hour of steam and water vapor, 178 parts per hour of chlorine and an insignificant quantity of other inert gases. These vapors pass up through a short packed section 11 where they exchange heat with downcoming cooling water, and then mix with hot incoming cell gases from line 1.

At or near the bottom of the vacuum stripping column 7, about 1,250 parts per hour of steam are preferably introduced through line 12. This steam strips out the last remaining vaporizable traces of chlorine from the water and raises its temperature to about 152.2 degrees Fahrenheit. The hot water, stripped of chlorine, is removed from the bottom of the vacuum stripping tower at a rate of 50,730 parts per hour through line 13 and has a quality capable of being pumped through pumping means 14 where it is sent through line 15 either for disposal of for further use as hot process water.

In this process, therefore, the total amount of steam used is about 1,800 parts per hour, whereas if the process had been operated in accordance with the prior art, about three times this much steam would have had to be used. Under circumstances where no steam is added to the stripping zone through line 12, even greater savings in steam can be realized.

EXAMPLE 2

Figure 2:
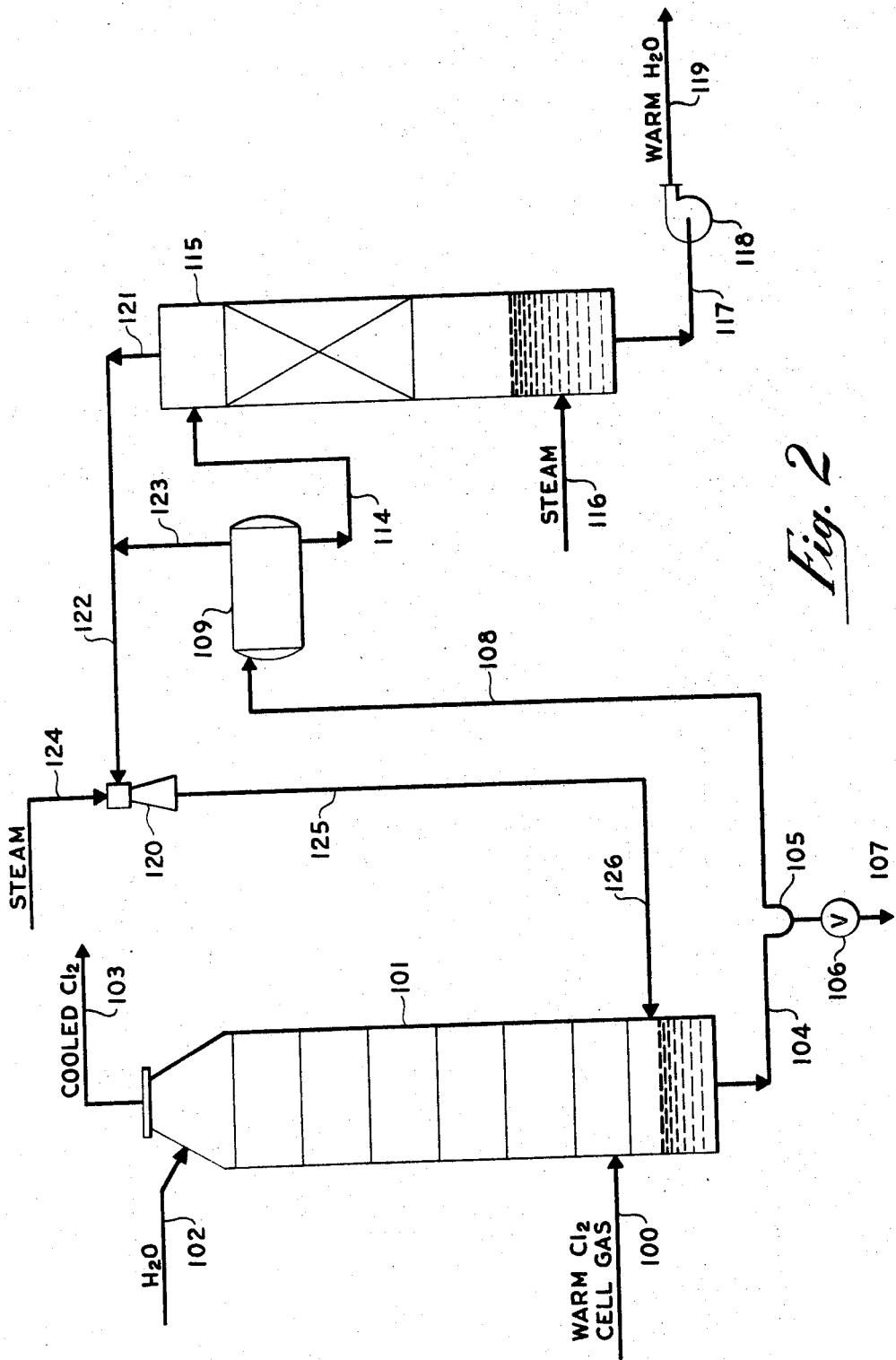

Referring to FIGURE 2, 66,606 parts per hour of warm chlorine cell gas at about 91.5 degrees centigrade, containing about 38,167 parts per hour of chlorine, 27,669 parts per hour of water vapor and the balance inerts, conveyed through line 100, enters near the bottom portion of a direct contact cooler 101. Cooling water (300,934 parts per hour) at ambient temperature is introduced through line 102 higher up in the direct contact cooler where it flows downwardly and countercurrently to the rising chlorine vapors, cooling them and condensing out substantial amounts of water vapor. It is preferred that the cooling water be derived from the blow gas absorber system described in U.S. Patent 2,750,002 where it contains some dissolved chlorine under pressure which, when introduced into the direct contact cooler operated at approximately atmospheric pressure, flashes off some of its previously dissolved chlorine permitting the chlorine to be recovered along with the main stream of chlorine gas. The cooled chlorine gas is then removed from the top of the direct contact cooler through line 103 where it is then sent to the drying, compression and liquefaction sections of the chlorine recovery system.

The water and condensed vapors (331,648 parts per hour) accumulated in the bottom of the direct contact cooler, at a temperature of about 87 degrees centigrade and pH less than about 7, are removed through line 104 where they are sent through a trap 105 which can be used to drain the lines through valve 106 and line 107 and then through line 108 into a surge or flash tank 109. Vapor removed from the surge tank through line 123 is mixed with the chlorine vapors removed from the top of the stripping section through line 121. This is achieved by having the vapor lines from the flash tank and the vacuum stripping column both in communication with the same vacuum source.

The surge tank, or flash drum 109, thus acts as a stripping zone for flashing off vapors of chlorine and water, as well as serving to take out surges in materials transferred from the direct contact cooler 101. The flash tank 109 thus helps to maintain the equilibrium in the system. In addition, it enables a saving in investment by permitting a smaller size steam jet ejector and smaller vacuum packed column. Liquid is removed from the surge tank through line 114 and passed into the top portion of a vacuum stripping column 115, where residual amounts of chlorine remaining in the water are stripped from it by steam (1,505 parts per hour) entering at line 116 near the bottom of the vacuum stripping column and rising countercurrently to the downwardly flowing water. The warm water (331,630 parts per hour) collected in the bottom of vacuum column 115, having a temperature of about 88 degrees centigrade, is withdrawn through line 117 by pump 118 and sent through line 119 for further process use or disposal. The quality of this warm water is such that it can be pumped. It contains less hypochlorite and chlorine, and is considerably less corrosive than the water resulting from the process of the prior art. Also, the water exiting from the system through line 119 does not present a water pollution problem.

The vacuum in the vacuum stripping tower 115 is maintained by any convenient means, but is shown in FIGURE 2 as a steam jet ejector 120 in communication with the top of the vacuum stripping column 115 through lines 121 and 122. The steam jet ejector may also be in communication with the vapor side of the surge tank through lines 123 and 122. The steam jet ejector 120 is operated by steam (1,995 parts per hour) introduced through line 124 and pulls a vacuum on the stripping column 115 and flash tank 109 of about 9 pounds per square inch absolute. In order to achieve this, the steam jet ejector 120 has a capacity of drawing a vacuum of 10 inches of mercury absolute, at shut off, or 16.5 inches of mercury at design capacity. The exhausted steam and vapors drawn through the steam jet ejector are sent through lines 125 and 126 back into the bottom portion of the direct contact cooler, where the water vapor is condensed out and the chlorine values are recovered as the vapors rise up through the direct contact cooler and come in contact with the countercurrently flowing water. The total steam requirements for the stripping column at line 116, plus that required for the steam jet ejector at line 124, are less by two-thirds the amount of steam needed for atmospheric stripping.

EXAMPLE 3

In a manner after Example 2, where a sufficient vacuum is being drawn on the stripping zone, and where other conditions permit, it is unnecessary to add steam at line 116. Thus, the stripping column 115 and its auxiliary lines and equipment can be eliminated, and instead the chlorine stripping can be carried out in flash tank 109 by removing the chlorine vapors through line 123 and by removing the warm water stripped of chlorine through line 114, where it can be passed for further process use or disposal. Under this set of conditions, substantially less than two-thirds the normal amount of steam requirements can be saved.

It is to be understood that the water solvent used in the process of this invention may also contain other chemicals, including dilute solutions of chlorine dissolved therein. Ordinary river water, well water, lake water, brackish water, salt water, including brine, treated or untreated, and other similar aqueous media are all considered to be within the scope of the word "water" used in this disclosure and the appended claims.

While applicants have illustrated their invention by the above description, it is to be understood that they are not to be limited to the specific examples or description because many modifications can be made to their invention by those of ordinary skill in the art.

I claim:
1. In the direct contact treatment of chlorine produced from the electrolysis of alkali metal chloride brine, wherein hot, wet chlorine vapors are cooled in a direct contact cooler zone with a water solvent, and the resultant warm water then stripped of dissolved chlorine, the improvement which comprises:

maintaining a single stripping zone under reduced pressure in the range between about 100 and about 700 millimeters of mercury absolute by a single steam jet ejector means whose vacuum side is in communication with the top of the stripping zone, while maintaining the direct contact cooler zone at about atmospheric pressure wherein said stripping zone comprises vacuum flash means and a single vertically disposed vacuum stripping column means each in communication with same vacuum source;

withdrawing chlorine-containing warmed water from near the lower portion of the direct contact cooler zone and passing it to said stripping zone so that the warmed water withdrawn from the direct contact cooling zone is passed to the flash means and where liquid removed therefrom is passed to the top portion of the stripping column and the vapors removed from the flash means are mixed with the vapors withdrawn from the top of the stripping column; contacting the water solvent countercurrently in the stripping zone with steam introduced to raise the temperature of the water solvent to near its boiling point at the reduced pressure maintained in said stripping zone, so that chlorine vapor is stripped from the water solvent and mixed with the chlorine vapors flashed off in the stripping zone;

withdrawing the resulting chlorine vapors from the upper portion of the stripping zone and introducing them near the lower portion of the direct contact cooling section; and withdrawing the resulting stripped water solvent from the bottom of the stripping zone.

2. The method of claim 1 wherein the warmed water withdrawn from the direct contact cooling zone is passed to a flash tank means maintained under said reduced pressure.

References Cited

UNITED STATES PATENTS

| 2,447,834 | 8/1948 | Balcar | 55—71 |
| 2,540,905 | 2/1951 | Neubauer et al. | 55—71 |
| 2,750,002 | 6/1956 | Hooker et al. | 55—71 |
| 3,254,474 | 6/1966 | Van Dijk | 55—55 |
| 2,861,040 | 11/1958 | Buchanan et al. | 55—71 |

SAMIH N. ZAHARNA, Primary Examiner.

C. N. HART, Assistant Examiner.

U.S. Cl. X.R.

55—71

UNITED STATES PATENT OFFICE
CERTIFICATE OF CORRECTION

Patent No. 3,422,599 January 21, 1969

Joseph M. Hildyard

It is certified that error appears in the above identified patent and that said Letters Patent are hereby corrected as shown below:

In the heading to the printed specification, lines 4 and 5, "909 River Road, Rte. 1, Youngstown, N. Y. 14174" should read -- Youngstown, N. Y., assignor to Hooker Chemical Corporation, Niagara Falls, N. Y., a corporation of New York --. Column 2, line 14, "caviation" should read -- cavitation --. Column 3, line 29, before "700" insert -- about --. Column 5, line 49, "1,995" should read -- 1,955 --.

Signed and sealed this 24th day of March 1970.

(SEAL)
Attest:

Edward M. Fletcher, Jr.　　　　　　　　　　WILLIAM E. SCHUYLER, JR.
Attesting Officer　　　　　　　　　　　　　　　Commissioner of Patents